Jan. 27, 1953 T. M. COLE 2,626,984

PLUG-IN DISTRIBUTION PANEL BOARD

Filed March 30, 1950 3 Sheets-Sheet 1

INVENTOR.
Thomas M. Cole

BY Edwin Lincoln + Harry Cole

Attorneys.

Jan. 27, 1953 T. M. COLE 2,626,984

PLUG-IN DISTRIBUTION PANEL BOARD

Filed March 30, 1950 3 Sheets-Sheet 2

INVENTOR.
Thomas M. Cole
BY Edwin Levisohn &
Harry Cole
Attorneys.

PLUG-IN DISTRIBUTION PANEL BOARD

Filed March 30, 1950 3 Sheets-Sheet 3

INVENTOR.
Thomas M. Cole
BY Edwin Levisohn + Harry Cole
Attorneys.

Patented Jan. 27, 1953 2,626,984

UNITED STATES PATENT OFFICE 2,626,984

PLUG-IN DISTRIBUTION PANEL BOARD

Thomas M. Cole, New York, N. Y., assignor to Federal Electric Products Company, Newark, N. J., a corporation Application March 30, 1950, Serial No. 152,945

23 Claims. (Cl. 175—298)

This invention relates to distribution panel boards.

One of the objects of the present invention is the provision of a distribution panel board construction which is of such character in respect to the various related parts thereof that it can be easily and quickly assembled at the point of use from parts obtainable from the wholesaler's or distributor's stock, thus eliminating the necessity for waiting for factory-assembled panel boards.

Another object is to provide a distribution panel board which while designed for a predetermined maximum number of switch units has provision for assembling with a standard part of one size a variable number of switch units of the same current size or of different current sizes, whereby the customer may buy the panel board with say only one or two switch units to satisfy his requirements at a particular time and may later add additional switch units as may be required at some later time or, may replace switch units of one current size with switch units of different current sizes, according to his requirements, without replacing the other parts of the panel board or the cabinet or enclosure thereof.

Another object is the provision of a panel board of the plug-in type comprising a plurality of bus bars and having provision for the releasable engagement with said bus bars, in plug-in fashion, of the receptacle contacts of a plurality of switch units of the pull-out type, the construction and arrangement being such that a plurality of switch units of the same current size or rating or of different current sizes or ratings may be plugged in in a panel board of one particular size.

Another object of the invention is the provision of a distribution panel board comprising a relatively small number of standardized parts which can be easily assembled in a cabinet or enclosure to produce the panel board.

A further object of the present invention is generally to provide a plug-in distribution panel board which is of simple and inexpensive construction and which is convenient to use.

The above and other objects, features and advantages of this invention will be fully understood from the following description considered in connection with the accompanying illustrative drawings.

Figure 4:
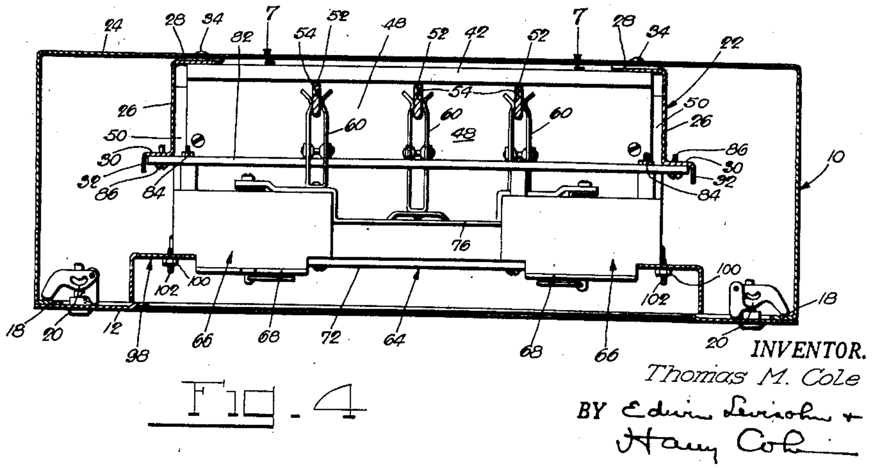
Fig. 4 is a sectional view on the line 4—4 of Fig. 1, the cabinet door being omitted.
Figure 5:
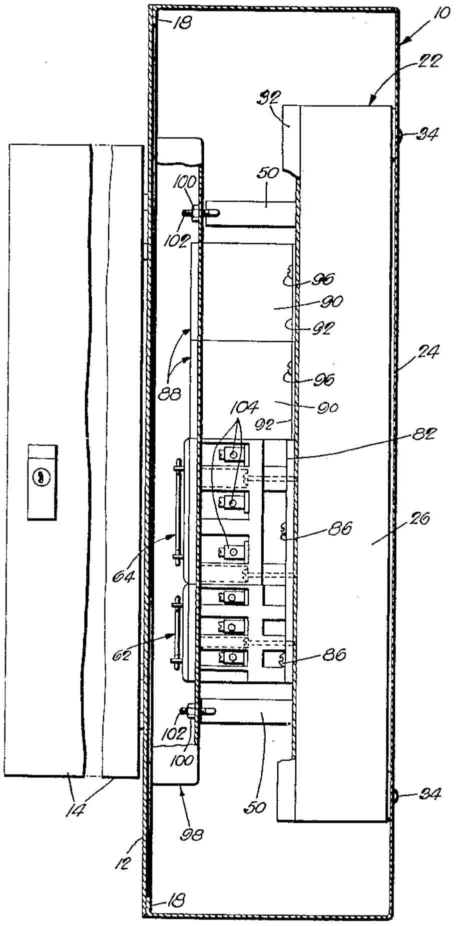
Fig. 5 is a sectional view on the line 5—5 of Fig. 1.

Referring now to the drawings in detail, the distribution panel board of the present invention comprises a metal cabinet which includes a box 10 and a front trim member 12 provided with a hinged door 14 for closing the front opening 16 of the cabinet. As here shown, the trim member 12 is secured to the front inturned peripheral flange 18 of box 10 by the releasable clamping elements 20 (Fig. 4), or in any other suitable way whereby said trim member may be easily removed from and replaced in position on box 10 when access to the interior thereof is desired for connecting wires or for any other purpose. As said fastening elements are well known and do not in themselves constitute part of the present invention, they are not specifically described herein, it being understood that these or any other releasable fastening means may be utilized for securing the trim member 12 removably at the front of the cabinet box 10.

Figure 3:
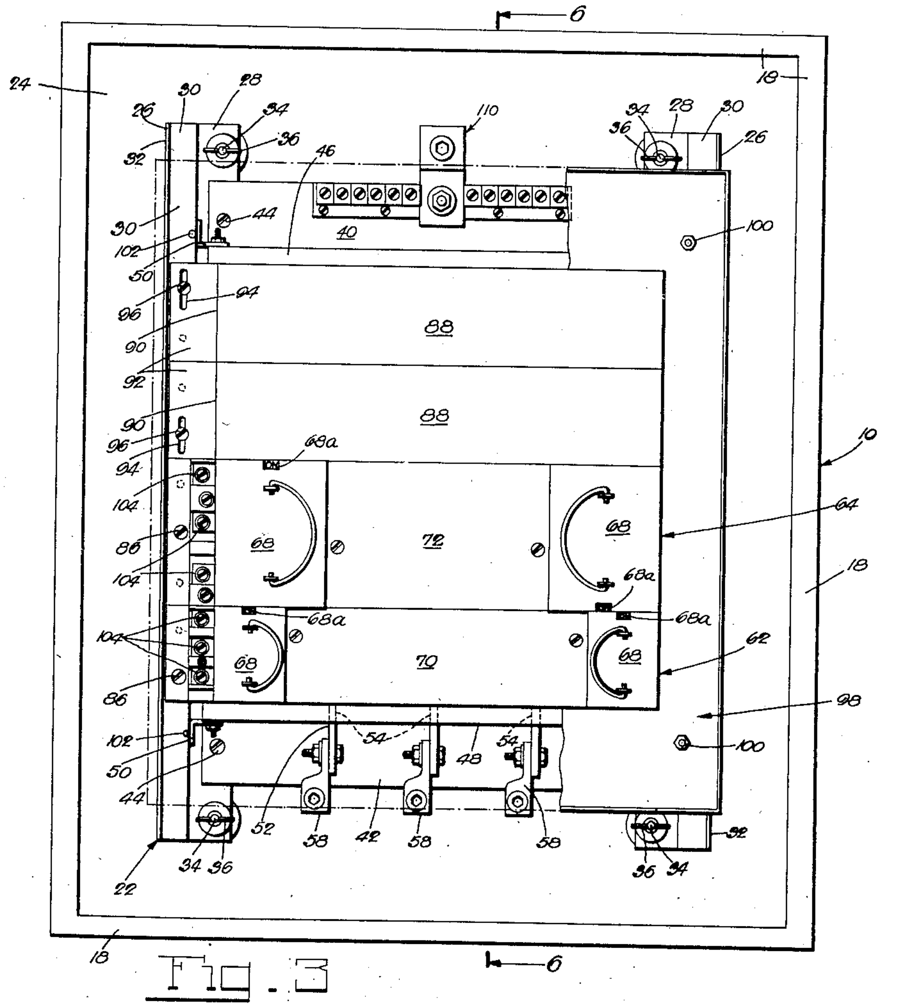
Fig. 3 is a view similar to Fig. 1, with parts omitted and parts cut away for the purpose of illustration.
Figure 6:
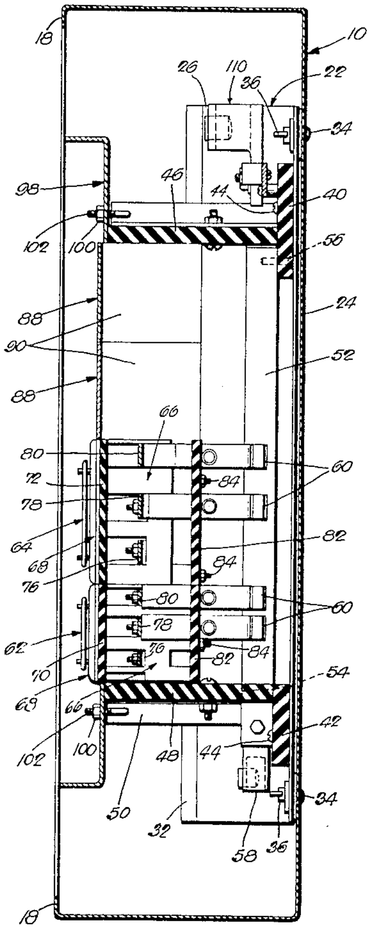
Fig. 6 is a sectional view on the line 6—6 of Fig. 3.
Figure 8:
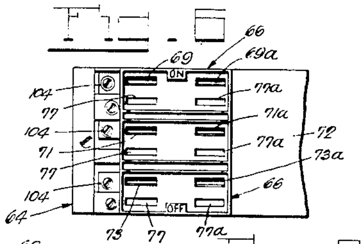
Fig. 8 is a front view of a pull-out switch receptacle, the pull-out contact member being removed.

A chassis or frame 22 of the construction which will now be described is releasably secured to the back wall 24 of the box. Said chassis comprises a pair of laterally spaced longitudinal frame members 26 each of which has an inturned end flange 28, and a shoulder 30 provided with a flange 32. As shown in Figs. 3 and 6, frame members 26 are releasably secured to wall 24 by screws or threaded studs 34 which project through openings in wall 24 and through companion openings in flanges 28 of members 26, companion wing nuts 36 on said studs serving to hold said frame members releasably in fixed position against the inner side of said wall. Frame 22 also includes the rigid cross members 40 and 42 which are formed of insulation material, such as rigid fibre board, and which are secured at their opposite ends to the flanges 28 of frame members 26 in any suitable way as by screws 44. Forwardly projecting rigid frame members 46 and 48, also preferably formed of rigid insulation material, such as fibre board, are secured to frame members 26; more specifically, said members 46 and 48 are each bolted at its opposite ends to the angle members 50 which are welded or otherwise suitably secured to frame members 26. It will be observed that the open-work frame or chassis 22 is thus formed of a small number of parts which are of simple construction and easily assembled and fastened together to provide a unit capable of being easily secured as a unit in the cabinet, which serves to close the rear of the open-work frame.

Bus bars 52 are mounted in the chassis 22 in laterally spaced relation, being held in position and in spaced parallel relation by cross members 40, 46 and 42, 48. For this purpose cross member 48 is provided with a plurality of through slots 54 through which the respective bus bars project at the lower end of the frame, and the upper ends of said bus bars are secured to cross member 46 by screws 56 (Fig. 6). The lower ends of the bus bars are provided with terminal connector members 58 for the feed wires (not shown). It will be observed that the bus bars are flat and of substantially rectangular cross section for engagement by contact members or stabs 60 carried by companion switch units which are mounted on frame 22 and which will now be more particularly referred to.

Figure 9:
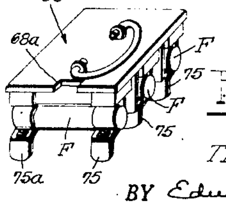
Fig. 9 is a perspective view of the pull-out contact member.
Figure 7:
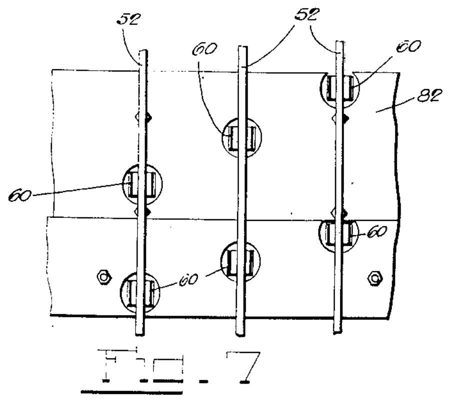
Fig. 7 is a fragmentary rear view as seen on the line 7—7 of Fig. 4.

In the present illustration of the panel board of the present invention, two switch units 62 and 64 of different current sizes, respectively, are shown. These switch units are of the fused pull-out type and are identical in construction except as to size. Each unit comprises two receptacles 66 which are provided with the stationary switch contacts and the companion pull-out contact member 68 which are provided with contacts which releasably engage the companion stationary contacts. As pull-out switches of this type are of known construction, a detailed description thereof is unnecessary; preferably, however, each pull-out switch comprises the receptacle 66 and a pull-out contact member 68 and is of the construction shown in my United States Patent No. 2,423,227. It will be understood that when the pull-out member 68 is in the switch-closing position in the companion receptacle 66, the cut-out 68*a* (Fig. 9) of the cover exposes the "On" indication on said receptacle and that in that position the companion stationary contacts 69, 69*a*, 71, 71*a*, and 73, 73*a* in the bottom of the receptacle are engaged and bridged by the corresponding set of the three sets of contacts 75, 75*a* carried by the cover of the pull-out member 68. The companion contacts 75, 75*a* of each set are electrically connected by a fuse F. When the pull-out member 68 is in switch-open position, the cut-out 68*a* of the cover exposes the "Off" indication on the receptacle, and the contacts 75, 75*a* of each set project into the companion openings 77, 77*a* respectively, of the receptacle. Thus, in both the switch on and switch off condition, each switch has a dead front, and it will be noted further that even when the pull-out member is removed from the receptacle, the dead-front condition is substantially preserved since the stationary contacts of the receptacle are in the bottom of the latter, remote from the front of the receptacle, and are, moreover, positioned so that they terminate short of the front surface of the bottom of the receptacle. As here shown, each of the switch units comprises two pull-out switches mechanically and electrically connected to each other. More particularly, the cross insulation member 70 for the narrower unit 62 and the wider insulation member 72 for the wider unit 64 constitute parts of the mechancial construction between the companion receptacles and, as here shown, the switch receptacle contacts of each unit are electrically inter-connected by the three conductor straps 76, 78 and 80 for the three phase system illustrated. It will be observed that the three plug-in contacts 60 which are associated with each of the switch units are carried by and electrically connected to the companion conductor straps 76, 78 and 80, respectively. The two receptacles 66 of each switch unit are secured to a rigid insulation mounting plate 82 in any suitable way as by screws 84. This mounting plate also serves to hold the companion receptacles 66 of the switch unit in fixed relation so that the unit may be plugged in or removed as a unit from the panel board. The switch mounting plate 82 is removably secured at its opposite ends to the shoulders 30 of the longitudinal frame members 26, in any suitable way as by screws 86. In this connection it will be understood that said shoulders 30 are provided with a plurality of longitudinally spaced threaded holes to receive screws 86, the number and spacing of said holes being such as to enable switch units of the same or different sizes to be secured to frame members 26 in adjacent side-by-side relation.

It will be observed that the distance between the confronting surfaces of insulation cross members 46 and 48 determines the longitudinal dimension of the frame available for mounting the several switch units. When, as here shown, the number of switch units is less than that available in the space between frame members 46 and 48, filler members 88, preferably formed of sheet metal may be positioned in the frame and removably secured to the longitudinal frame members 26 to provide a dead-front panel. The front surfaces of said filler members are flush with the front surfaces of the cross members 70, 72 of the switch units. The filler members 88 have downturned end portions 90 provided with flanges 92 which are slotted as indicated at 94 for the fastening screws 96 by which they are secured releasably to the frame members 26.

Figure 1:
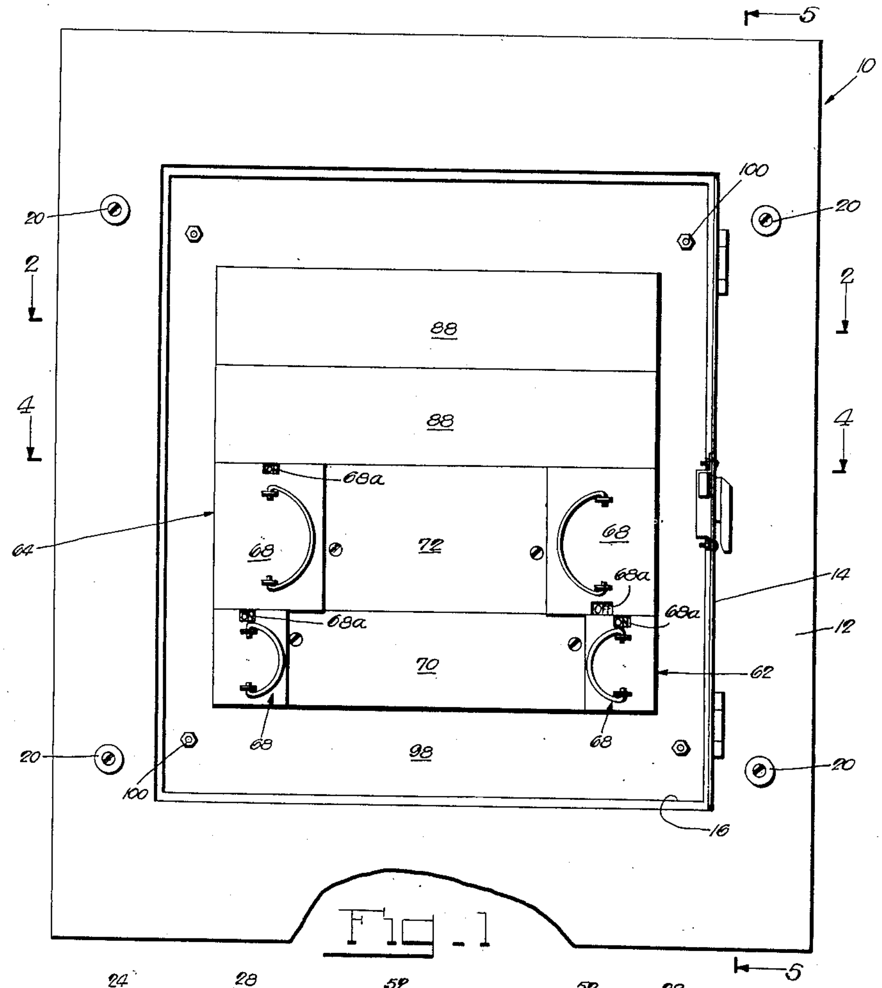
Fig. 1 is a front view of a plug-in distribution panel board embodying the present invention, the cabinet door being open.
Figure 2:
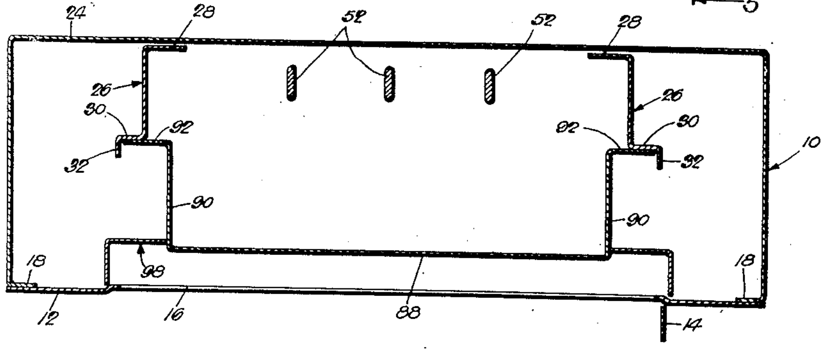
Fig. 2 is a sectional view on the line 2—2 of Fig. 1.

The frame is provided with a removable trim member 98 which, as shown in Fig. 1, surrounds the assembly of switch units. The inner surface of the front of said trim member abuts the front edges of the cross members 46 and 48 and is held removably in position by nuts 100 which engage the screw threaded terminal ends 102 on the angle members 50.

It will be observed that the chassis 22 is of such size in relation to the interior of the cabinet box 10 to provide ample gutter space for wiring. Further in this connection it will be observed that each switch unit has its terminals 104 disposed near the adjacent side gutters and is readily accessible for wiring when the frame trim member 98 is removed from frame 22. As will be readily understood, box 10 is provided with a plurality of knock-outs for the passage of the main feeder and branch circuit wires.

When it is desired to add switch units to the panel board this may be readily accomplished by the customer or user by removing trim member 98 to provide access to the frame 22 and by replacing one or more of the filler members by one or more switch units, as the case may be, and thereafter restoring trim member 98 in position.

In the present commercial practice of the invention by my assignee, the panel boards are provided in four sizes as to the height of the cabinet and the corresponding height of the chassis or frame measured in the direction of the bus bar length or runs. The width of the cabinets and of the frames and the spacing of the bus bars are the same for all height-sizes. Accordingly, switch units of the same width may be used interchangeably in panel boards of all of the different height-sizes. The switch units of the different current sizes, while of the same width are of different heights, measured in the direction of the length of the bus bars. For example, in the illustrated panel board, representing one of the four sizes of cabinet and chassis referred to above, the switch units 62 and 64 are of the same width but are of different heights, and these switch units and others of the same width can be plugged into any of the panel boards of the other three sizes. The heights of the switch units of the different sizes are related in a definite way so that various combinations of switch units of different sizes will fill or substantially fill the space between end members 46 and 48 of the frame of any one of the height sizes. For example, the switch units may be in height sizes of 3″, 3½″, 4½″, 6″, 9″ and 12″. Assuming, for example, that the space available between end members 46 and 48 of the chassis is 13½″, which is actually that of the smallest of the above mentioned four commercial sizes, three of the 4½″ switch units, or one of the 4½″ and one of the 9″ switch units, or four of the 3″ switch units and a 1½″ filler member, or one of the 12″ switch units and a 1½″ filler member, or two of the 6″ switch units and a 1½″ filler member, or one of the 6″ and two of the 3″ switch units and a 1½″ filler member, etc., can be disposed in and will fill or substantially fill the said space. Filler members 88 can be of the same length as the 3″ switch units but in the present commercial practice of this invention, the filler members are supplied also in greater heights, especially for the panel board frames of the larger height sizes. In the three larger panel boards, the spaces available for switch units are 18″, 24″ and 36″, respectively, and it will therefore be apparent that various combinations of the switch units in the same or different height sizes can be disposed in said respective spaces so as to fill or substantially fill the latter and that in these large sizes, as well as in the smaller size, combinations of switch units and filler members can be disposed in the spaces when less than the maximum available space is required for the desired number of switch units. It will be understood that the dimensions and sizes referred to are to be considered only as illustrative and not in a limiting sense.

The panel board of the present invention can be used on any of the various electrical systems, including the 3-phase-4 wire, 3-phase-3 wire, 3 wire, and 2 wire. When the panel board is ordered for use on 3-phase-4 wire system or for a 3 wire system, a neutral terminal strap 110 is provided on the cross insulation member 40. It will be understood that when the panel board is to be used for two pole circuits, the switch units need have only two sets of contacts 75, 75a instead of the three sets shown in Fig. 9.

Thus it will be understood that a panel board of the desired size or parts therefor can be readily obtained from the wholesaler or distributor from the latter's stock of cabinets, frames and switch units, thereby obviating the need for the customer to order a specified panel board from the manufacturer, and in obtaining the panel board from the distributor the customer can select the size according to his present requirements with provision for extension for future requirements by the acquisition of additional or substituted switch units. Also it will be noted that the customer can order the neutral strap 110 when the latter is required for the system used. Similarly, either 3 pole or 2 pole switch units can be ordered as required.

Various changes in the details of construction and in the form and arrangement of parts may be made without departing from the underlying idea or principles of the invention within the scope of the appended claims.

Having thus described my invention, what I claim and desire to secure by Letters Patent, is:

1. A panelboard comprising a frame including laterally spaced longitudinal members and laterally spaced cross connecting members holding said longitudinal members in said relation and defining a rectangular frame structure open at the front of the frame, a plurality of bus bars carried by said cross members and disposed in laterally spaced relation in said frame and extending parallel to said longitudinal frame members, front shoulders on said longitudinal frame members, and a plurality of electrical devices having electrical connector members for engaging said bus bars and having means for releasably securing the devices to said shoulders for holding the devices in position on said frame, said devices comprising a pair of individual switch receptacles each provided with means for releasably securing said receptacles to said shoulder, each of said receptacles being provided with stationary contacts connected to said connector members, and a pull-out switch member removably mounted in each of said receptacles, said pull-out switch members carrying contacts which engage companion stationary contacts, respectively, of the companion receptacle when said pull-out member is mounted in a predetermined position in the companion receptacle.

2. A panelboard comprising an open-work frame unit adapted for releasable mounting within an enclosure, said unit including laterally spaced longitudinal members and laterally spaced cross connecting members holding said longitudinal members in said relation and defining a rectangular open-work frame structure, said cross connecting members being formed of electrical insulating material, and a plurality of bus bars disposed in laterally spaced relation in said frame and extending parallel to said longitudinal frame members, said bus bars being held in said relation by said cross connecting members, and a plurality of switch units mounted on and releasably secured to said longitudinal members in positions transversely of the latter and provided with contacts releasably engageable with said bus bars, said switch units comprising a pair of individual switch receptacles each provided with stationary contacts connected to said releasably engageable contacts, and a pull-out switch member removably mounted in each of said receptacles, said pull-out switch members carrying contacts which engage companion stationary contacts, respectively, of the companion receptacle when said pull-out member is mounted in a predetermined position in the companion receptacle.

3. A panelboard comprising an open-work frame unit adapted for releasable mounting within an enclosure, said unit including laterally spaced longitudinal members and laterally spaced cross connecting members holding said longitudinal members in said relation and defining a rectangular open-work frame structure, a plurality of bus bars carried by said cross members and disposed in laterally spaced relation in said frame and extending parallel to said longitudinal frame members, and a switch receptacle mounted on said frame and having a contact member engaging one of said bus bars, said receptacle having a stationary contact connected to said contact member, and a pull-out switch member removably mounted in said receptacle and having a contact engaging said stationary contact of the receptacle when said pull-out member is mounted in predetermined position therein.

4. A panelboard comprising a frame including laterally spaced longitudinal members and laterally spaced cross connecting members holding said longitudinal members in said relation and defining a rectangular frame structure open at the front of the frame, a plurality of bus bars carried by said cross members and disposed in laterally spaced relation in said frame and extending parallel to said longitudinal frame members, a plurality of switch receptacles mounted on said frame and provided with contact members engaging said bus bars, said receptacles being provided with stationary contacts connected to said contact members, respectively, and pull-out switch members removably mounted in said receptacles and having contacts engaging companion stationary contacts of the receptacles when said pull-out members are mounted in a predetermined position therein.

5. A panelboard comprising an open-work frame unit adapted for releasable mounting within an enclosure, said unit including laterally spaced longitudinal members and laterally spaced cross connecting members holding said longitudinal members in said relation and defining a rectangular open-work frame structure, a plurality of bus bars disposed in laterally spaced relation in said frame and extending parallel to said longitudinal frame members, a plurality of switch receptacles mounted on said frame and provided with contact members engaging said bus bars, said receptacles being provided with stationary contacts connected to said contact members, respectively, and pull-out switch members removably mounted in said receptacles and having contacts engaging companion stationary contacts of the receptacles when said pull-out members are mounted in predetermined position therein, said pull-out members extending across the space between said longitudinal frame members and having dead-front closure means carried thereby and terminating in a plane parallel to and adjacent the front of said frame, said pull-out members being of less extent than said opening in the longitudinal direction of said frame members, and filler means releasably secured to said frame members in position laterally and overlying the bus bars, at the front of the frame, said filler means extending across the space between said longitudinal members and terminating substantially flush with the front of said closure means and covering the part of frame opening which is not covered by said pull-out members, said filler means being insulated from said bus bars and completing the dead-front condition of the panel board.

6. A panelboard comprising a frame including laterally spaced longitudinal members and laterally spaced cross connecting members holding said longitudinal members in said relation and defining a rectangular frame structure open at the front of the frame, a plurality of bus bars disposed in laterally spaced relation in said frame and extending parallel to said longitudinal frame members, and switching means mounted on said frame and provided with contact members engaging said bus bars, said switching means extending across the space between said longitudinal frame members and having dead-front closure means carried thereby and terminating in a plane parallel to and adjacent the front of said frame, said switching means being of less extent than said opening in the longitudinal direction of said frame members, and filler means releasably secured to said frame members in position laterally and overlying the bus bars, at the front of the frame, said filler means extending across the space between said longitudinal members and terminating substantially flush with the front of said closure means and covering the part of frame opening which is not covered by said switching means, said filler means being insulated from said bus bars and completing the dead-front condition of the panel board, said switching means having branch terminals, and a member releasably secured to said frame at the front of the latter in position around said opening and overlying said branch terminals to prevent access thereto from the front of said frame.

7. A panelboard, comprising a frame having laterally spaced longitudinal members, bus bars mounted in said frame in laterally spaced relation in position between and parallel to said frame members, switch receptacle means mounted on said frame and provided with contact members engaging said bus bars, said receptacle means being provided with stationary contacts connected to said contact members, respectively, and pull-out switch means removably mounted in said receptacle means and having contacts engaging companion stationary contacts of the receptacle means when said pull-out members mount in a predetermined position therein, said pull-out switch means extending across the space between said longitudinal frame members and having dead-front closure means carried thereby and terminating in a plane parallel to and adjacent the front of said frame.

8. A panelboard, comprising an open-work frame unit adapted for releasable mounting within an enclosure, said unit having laterally spaced longitudinal members, bus bars mounted in said frame in laterally spaced relation in position between and parallel to said frame members, and switching means mounted on said frame and provided with contact members engaging said bus bars, said switching means extending across the space between said longitudinal frame members and having dead-front closure means carried thereby and terminating in a plane parallel to and adjacent the front of said frame, said switching means comprising a pair of individual switch receptacles each provided with stationary contacts connected to said contact members, and a pull-out switch member removably mounted in each of said receptacles and forming a part of said dead-front closure means, said pull-out switch members carrying contacts which engage companion stationary contacts, respectively, of the companion receptacle when said pull-out member is mounted in a predetermined position in the companion receptacle.

9. A panelboard, comprising an open-work frame unit adapted for releasable mounting within an enclosure, said unit having laterally spaced longitudinal members, bus bars mounted in said frame in laterally spaced relation in position between and parallel to said frame members, and switching means mounted on said frame and provided with contact members engaging said bus bars, said switching means extending across the space between said longitudinal frame members and having dead-front closure means carried thereby and terminating in a plane parallel to and adjacent the front of said frame, said switching means comprising a pair of individual switch receptacles each provided with stationary contacts connected to said contact members, and a pull-out switch member removably mounted in each of said receptacles and forming a part of said dead-front closure means, said pull-out switch members carrying contacts which engage companion stationary contacts, respectively, of the companion receptacle when said pull-out member is mounted in a predetermined position in the companion receptacle, said receptacles being disposed laterally of each other between said frame members and connected together as a unit for the mounting thereof on said frame and for the engagement and disengagement, respectively, of said contact members thereof with and from said bus bars when the unit is respectively mounted on and removed from the frame.

10. A panelboard assembly, comprising an open-work frame unit adapted for releasable mounting within an enclosure, said unit and a plurality of switch units, said frame having bus bars mounted thereby at the back thereof and having an opening at the front thereof for the connection to said bus bars through said opening of said switch units when the latter are mounted on the front of the frame, the latter having formations at said front of the frame for the releasable securement thereto of said switch units, said switch units each having contacts engaging said bus bars in plug-in fashion when the units are mounted on the frame, the switch units being of the same size in their dimension laterally of the frame and transversely of the run of the bus bars and of different sizes in their dimensions which are parallel to the run of said bus bars and the dimension of the frame opening in the direction of the run of the bus bars being related to said last mentioned dimensions of the switch units so that a plurality of switch units in each of various combinations of said different sizes can be mounted on said frame and entirely cover said frame opening.

11. A panelboard assembly, comprising an open-work frame unit adapted for releasable mounting within an enclosure, said unit and a plurality of switch units, said frame having bus bars mounted thereby at the back thereof and having an opening at the front thereof for the connection to said bus bars through said opening of said switch units when the latter are mounted on the front of the frame, the latter having formations at said front of the frame for the releasable securement thereto of said switch units, said switch units each having contacts engaging said bus bars in plug-in fashion when the units are mounted on the frame, the switch units being of the same size in their dimension laterally of the frame and transversely of the run of the bus bars and of different sizes in their dimensions which are parallel to the run of said bus bars and the dimension of the frame opening in the direction of the run of the bus bars being related to said last mentioned dimensions of the switch units so that a plurality of switch units in each of various combinations of said different sizes can be mounted on said frame and entirely cover said frame opening, said switch units being of the dead-front type so that the panel board has a dead front when said switch units are mounted on the frame and cover said opening.

12. A panelboard assembly, comprising an open-work frame unit adapted for releasable mounting within an enclosure, said unit and a plurality of switch units, said frame having bus bars mounted thereby at the back thereof and having an opening at the front thereof for the connection to said bus bars through said opening of said switch units when the latter are mounted on the front of the frame, the latter having formations at said front of the frame for the releasable securement thereto of said switch units, said switch units each having contacts engaging said bus bars in plug-in fashion when the units are mounted on the frame, the switch units being of the same size in their dimension laterally of the frame and transversely of the run of the bus bars and of different sizes in their dimensions which are parallel to the run of said bus bars and the dimension of the frame opening in the direction of the run of the bus bars being related to said last mentioned dimensions of the switch units so that a plurality of switch units in each of various combinations of said different sizes can be mounted on said frame and entirely cover said frame opening, said switch units being of the dead-front type so that the panel board has a dead front when said switch units are mounted on the frame and cover said opening, said switch units having receptacles attachable to the frame and provided with stationary switch contacts which are disposed a substantial distance rearwardly of the fronts of the receptacles, respectively, and the movable contacts of said switch units being carried by reversible pull-out members whereby the dead-front condition of the panelboard is substantially preserved in both the open and closed conditions of the switches both when said pull-out members are in their companion receptacles or are removed therefrom.

13. A panelboard assembly, comprising an open-work frame unit adapted for releasable mounting within an enclosure, said unit and a plurality of switch units, said frame having bus bars mounted thereby at the back thereof and having an opening at the front thereof for the connection to said bus bars through said opening of said switch units when the latter are mounted on the front of the frame, the latter having formations at said front of the frame for the releasable securement thereto of said switch units, said switch units each having contacts engaging said bus bars in plug-in fashion when the units are mounted on the frame, the switch units being of the same size in their dimension laterally of the frame and transversely of the run of the bus bars and of different sizes in their dimensions which are parallel to the run of said bus bars and the dimension of the frame opening in the direction of the run of the bus bars being related to said last mentioned dimensions of the switch units so that a plurality of switch units in each of various combinations of said different sizes can be mounted on said frame and entirely covers said frame opening and complementary filler members mountable on said frame to cover a part of said opening when less than the number of switch units required to completely cover said opening are mounted on the frame.

14. A panelboard assembly, comprising a frame and a plurality of switch units, said frame having bus bars mounted at the back thereof and having an opening at the front thereof for the connection to said bus bars through said opening of said switch units when the latter are mounted on the front of the frame, the latter having formations at said front of the frame for the releasable securement thereto of said switch units, said switch units each having contacts engaging said bus bars in plug-in fashion when the units are mounted on the frame, the switch units being of the same size in their dimension laterally of the frame and transversely of the run of the bus bars and of different sizes in their dimensions which are parallel to the run of said bus bars and the dimension of the frame opening in the direction of the run of the bus bars being related to said last mentioned dimensions of the switch units so that a plurality of switch units in each of various combinations of said different sizes can be mounted on said frame and entirely cover said frame opening, said switch units being of the dead-front type so that the panel board has a dead front when said switch units are mounted on the frame and cover said opening, said switch units having branch terminals disposed rearwardly of the front of the frame, and a frame member releasably securable to the frame at the front thereof around said opening for covering said branch terminals.

15. A panelboard assembly, comprising an open-work frame unit adapted for releasable mounting within an enclosure, said unit and a plurality of switch units, said frame having bus bars mounted thereby at the back thereof and having an opening at the front thereof for the connection to said bus bars through said opening of said switch units when the latter are mounted on the front of the frame, the latter having formations at said front of the frame for the releasable securement thereto of said switch units, said switch units each having contacts engaging said bus bars in plug-in fashion when the units are mounted on the frame, the switch units being of the same size in their dimension laterally of the frame and transversely of the run of the bus bars, the dimension of the frame opening in the direction of the run of the bus bars being related to the corresponding dimensions of the switch units so that when a predetermined number of the latter are mounted in adjacent side-by-side relation on the frame the opening of the latter is completely covered thereby.

16. A panelboard assembly, comprising an open-work frame unit adapted for releasable mounting within an enclosure, said unit and a plurality of switch units, said frame having bus bars mounted thereby at the back thereof and having an opening at the front thereof for the connection to said bus bars through said opening of said switch units when the latter are mounted on the front of the frame, the latter having formations at said front of the frame for the releasable securement thereto of said switch units, said switch units each having contacts engaging said bus bars in plug-in fashion when the units are mounted on the frame, the switch units being of the same size in their dimension laterally of the frame and transversely of the run of the bus bars, the dimension of the frame opening in the direction of the run of the bus bars being related to the corresponding dimensions of the switch units so that when a predetermined number of the latter are mounted in adjacent side-by-side relation on the frame the opening of the latter is completely covered thereby and complementary filler members mountable on said frame to cover a part of said opening when less than the number of switch units required to completely cover said opening are mounted on the frame.

17. A panelboard assembly, comprising a frame and a plurality of switch units, said frame having bus bars mounted at the back thereof and having an opening at the front thereof for the connection to said bus bars through said opening of said switch units when the latter are mounted on the front of the frame, the latter having formations at said front of the frame for the releasable securement thereto of said switch units, said switch units each having contacts engaging said bus bars in plug-in fashion when the units are mounted on the frame, the switch units being of the same size in their dimension laterally of the frame and transversely of the run of the bus bars, the dimension of the frame opening in the direction of the run of the bus bars being related to the corresponding dimensions of the switch units so that when a predetermined number of the latter are mounted in adjacent side-by-side relation on the frame the opening of the latter is completely covered thereby, said switch units having branch terminals disposed rearwardly of the front of the frame, and a frame member releasably securable to the frame at the front thereof around said opening for covering said branch terminals.

18. A panelboard assembly, comprising an enclosure having a continuous front opening, an open-work frame mounted in said enclosure and having its front opening back of said enclosure opening, at least three bus bars carried by said frame in spaced parallel relation, substantial lengths of said bus bars being exposed through said frame opening for engagement by switch-connection members, and formations on said frame at the front opening thereof and within said enclosure for mounting a plurality of switches thereon with the switch-connection members in engagement with at least two of said bus bars, and a plurality of switches mounted on said frame and closing the front opening thereof, said switches extending transversely of said bus bars and having dead-front closure means carried thereby and terminating in a plane parallel to and adjacent the front of said frame, said switches comprising a pair of individual switch receptacles each provided with stationary contacts connected to said switch connection members, and a pull-out switch member removably mounted in each of said receptacles and forming a part of said dead-front closure means, said pull-out switch members carrying contacts which engage companion stationary contacts, respectively, of the companion receptacle when said pull-out member is mounted in a predetermined position in the companion receptacle.

19. A panelboard assembly, comprising an enclosure having a continuous front opening, an open-work frame mounted in said enclosure and having its front opening back of said enclosure opening, at least three bus bars carried by said frame in spaced parallel relation, substantial lengths of said bus bars being exposed through said frame opening for engagement by switch-connection members, and formations on said frame at the front opening thereof and within said enclosure for mounting a plurality of switches thereon with the switch-connection members in engagement with at least two of said bus bars, a plurality of switches having receptacle means mounted on said frame and provided with said switch connection members in engagement with at least two of said bus bars, said receptacle means having stationary contacts connected to said connection members, respectively, and pull-out switch means removably mounted in said receptacle means and having contacts engaging companion stationary contacts of the receptacle means when said pull-out means are mounted in a predetermined position therein, and means in said enclosure for mounting a neutral-terminal device therein.

20. A panelboard assembly, comprising an enclosure having a continuous front opening, an open-work frame mounted in said enclosure and having its front opening back of said enclosure opening, at least three bus bars carried by said frame in spaced parallel relation, substantial lengths of said bus bars being exposed through said frame opening for engagement by switch-connection members, and formations on said frame at the front opening thereof and within said enclosure for mounting a plurality of switches thereon with the switch-connection members in engagement with at least two of said bus bars, and a plurality of switches having receptacle means mounted on said frame and provided with said switch-connection members in engagement with at least two of said bus bars, said receptacle means having stationary contacts connected to said connection members, respectively, and pull-out switch means removably mounted in said receptacle means and having contacts engaging companion stationary contacts of the receptacle means when said pull-out means are mounted in a predetermined position therein.

21. A panelboard assembly, comprising an enclosure having a front opening, a frame mounted in said enclosure and having an opening back of said enclosure opening, at least three bus bars carried by said frame in spaced parallel relation, lengths of said bus bars being exposed through said frame opening for engagement by switch-connection members, formations on said frame within said enclosure for mounting a plurality of switches thereon with the switch-connection members in engagement with at least two of said bus bars, a plurality of switches having receptacle means mounted on said frame and provided with said switch-connection members in engagement with at least two of said bus bars, said receptacle means having stationary contacts connected to said connection members, respectively, and pull-out switch means removably mounted in said receptacle means and having contacts engaging companion stationary contacts of the receptacle means when said pull-out means are mounted in a predetermined position therein, and a trim member removably mounted on the front of said enclosure, said trim member having an opening through which the pull-out members of said switches may be inserted and removed.

22. A panelboard assembly comprising an enclosure having a front opening, a frame mounted in said enclosure and having an opening back of said enclosure opening, at least three bus bars carried by said frame in spaced parallel relation, lengths of said bus bars being exposed through said frame opening for engagement by switch-connection members, formations on said frame within said enclosure for mounting a plurality of switches thereon with the switch-connection members in engagement with at least two of said bus bars, a plurality of switches having receptacle means mounted on said frame and provided with said switch-connection members in engagement with at least two of said bus bars, said receptacle means having stationary contacts connected to said connection members, respectively, and pull-out switch means removably mounted in said receptacle means and having contacts engaging companion stationary contacts of the receptacle means when said pull-out means are mounted in a predetermined position therein, and a trim member removably mounted on the front of said enclosure, said trim member having an opening through which the pull-out members of said switches may be inserted and removed, said trim member being provided with a door for closing said opening thereof, said trim member and said door providing means for closing said opening of the enclosure.

23. A panelboard assembly, comprising an enclosure having a continuous front opening, an open-work frame mounted in said enclosure and having its front opening back of said enclosure opening, at least three bus bars carried by said frame in spaced parallel relation, substantial lengths of said bus bars being exposed through said frame opening for engagement by switch-connection members, and formations on said frame at the front opening thereof and within said enclosure for mounting a plurality of switches thereon with the switch-connection members in engagement with at least two of said bus bars, a plurality of switches having receptacle means mounted on said frame and provided with said switch connection members in engagement with at least two of said bus bars, said receptacle means having stationary contacts connected to said connection members, respectively, and pull-out switch means removably mounted in said receptacle means and having contacts engaging companion stationary contacts of the receptacle means when said pull-out means are mounted in a predetermined position therein, and a neutral-terminal strap carried by said frame.

THOMAS M. COLE.

REFERENCES CITED

The following references are of record in the file of this patent:

UNITED STATES PATENTS

| Number | Name | Date |
|---|---|---|
| 968,071 | Nielsen | Aug. 23, 1910 |
| 1,321,486 | Starrett | Nov. 11, 1919 |
| 1,332,555 | Hunt | Mar. 2, 1920 |
| 1,930,028 | Adam | Oct. 10, 1933 |
| 2,147,023 | Frank | Feb. 14, 1939 |
| 2,199,626 | Freese | May 7, 1940 |
| 2,276,226 | Cole | Mar. 10, 1942 |
| 2,359,247 | Rowe | Sept. 26, 1944 |
| 2,440,824 | Jackson | May 4, 1948 |
| 2,495,531 | Lederer | Jan. 24, 1950 |
| 2,530,548 | Stanley | Nov. 21, 1950 |